United States Patent Office 3,409,634
Patented Nov. 5, 1968

3,409,634
2,3-BIS(P-METHOXYPHENYL)INDOLES
Jacob Szmuszkovicz, Kalamazoo, Mich., assignor to The Upjohn Company, Kalamazoo, Mich., a corporation of Delaware
No Drawing. Continuation-in-part of application Ser. No. 397,649, Sept. 18, 1964. This application July 29, 1965, Ser. No. 475,889
13 Claims. (Cl. 260—326.16)

ABSTRACT OF THE DISCLOSURE

The invention involves novel 2,3-bis-(p-methoxyphenyl) indoles, compositions thereof, and novel methods for utilizing the novel compositions. The novel compounds are useful as anti-inflammatory, analgesic and antipyretic agents.

---

This application is a continuation-in-part of Ser. No. 397,649, filed Sept. 18, 1964, now abandoned.

The present invention is directed to novel compounds and compositions and is more particularly directed to novel 2,3-bis(p-methoxyphenyl)indoles, to novel compositions containing the novel 2,3-bis(p-methoxyphenyl) indoles, and to a novel method utilizing the novel compositions as therapeutic agents.

The novel 2,3-bis(p-methoxyphenyl)indoles of the present invention can be represented by the formula:

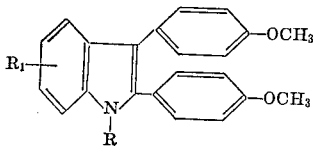

I wherein R represents hydrogen, methyl, and alkanoyl of one to four carbon atoms, inclusive, i.e., formyl, acetyl, propionyl, butyryl and isobutyryl, and $R_1$ represents hydrogen, halogen, i.e., chloro, fluoro, iodo, and bromo, alkoxy of one to three carbon atoms, inclusive, i.e., methoxy, ethoxy, propoxy, and isopropoxy, and alkyl of one to three carbon atoms, inclusive, i.e., methyl, ethyl, propyl, and isopropyl.

The novel compounds of the present invention can be prepared by a variety of processes known in the art, for example, compounds of the formula:

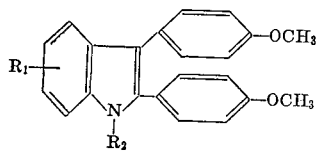

II wherein $R_1$ has the above value and $R_2$ represents hydrogen and methyl can be prepared in accordance with the well-known Fischer indole synthesis by reacting 4'-methoxy-2-(p-methoxyphenyl) acetophenone (commonly called deoxyanisoin) with a phenylhydrazine represented by the formula:

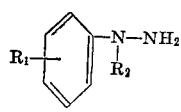

III wherein $R_1$ and $R_2$ are as given above. Suitable reaction conditions are illustrated in the examples below, as well as in the abundant chemical literature pertaining to the preparation of indole compounds by the Fischer synthesis, particularly the literature pertaining to the preparation of 2,3-diarylindoles (e.g., German Patent 574,840; Coldham et al., J. Chem. Soc. 4528, 1954).

The novel compounds of Formula II can also be prepared by condensing p-anisoin (4,4'-dimethoxybenzoin) with an aniline represented by the formula:

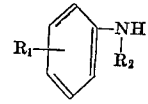

IV wherein $R_1$ and $R_2$ are as given above. The condensation can be carried out in one step, employing reaction conditions known in the art for effecting such condensations. [Japp et al. Ber. 26, 2638, 1893; Ritchie, J. Proc. Roy. Soc. N. S. Wales 80, 33, 1946 (C.A. 41, 3094, 1947); Baroni et al., Zhur. Obshchei. Khim. 29, 3815, 1959 (C.A. 54, 19643, 1960); Coldham et al., supra].

Alternatively, the novel compounds of Formula II can be prepared in two steps, using the same starting materials as in the one-step process described immediately above, namely, p-anisoin and an aniline of Formula IV. In the first step, the reactants are condensed to obtain a 2-anilino - 4' - methoxy - 2 - (p-methoxyphenyl)acetophenone [Pratt et al., J. Org. Chem. 28, 1366, 1963; Novelli et al., Anales Asoc. Quim. Argentina 31, 147, 1943 (C.A. 38, 2957, 1944)] represented by the formula:

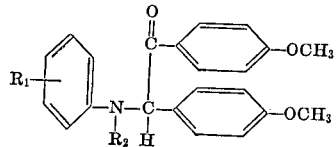

V wherein $R_1$ and $R_2$ are as given above. Advantageously, the condensation is effected by heating the reactants in the presence of a strong acid, e.g., concentrated hydrochloric acid. (Coldham et al., supra, describe a similar condensation of benzoin and 6-chloro-m-toluidine). The condensation can also be effected in the presence of p-toluenesulfonic acid and an inert solvent such as benzene, the water formed during the reaction being removed azeotropically. The thus-obtained compound of Formula V is then cyclized to obtain the desired 2,3-bis(p-methoxyphenyl) indole of Formula II. The cyclization can be accomplished by heating the compound of Formula V, preferably at temperatures ranging between about 150 and about 250° C., in the presence of an acid, e.g., p-toluenesulfonic, sulfuric, oxalic, and the like, and an inert liquid medium such as p-cymene, mineral oil, decahydronaphthalene, and the like. (Kamlet et al., J. Org. Chem. 26, 220, 1961, describe the preparation of 2,3-diphenylindole and benzene-ring-substituted 2,3-diphenyl-indoles in a similar manner).

Another process for preparing the novel compounds of Formula II involves the condensation of an aniline of Formula IV with a 2-halo-4'-methoxy-2-(p-methoxyphenyl)acetophenone (Drefahl et al., Ann. 589, 82, 1954) represented by the formula:

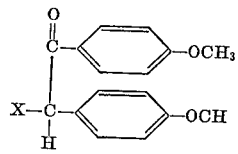

VI wherein X is halogen, e.g., chloro, bromo (preferred), or iodo, preferably employing at least two molar amounts of the aniline compound for each molar amount of the compound of Formula VI. [Baroni et al., supra, describe the preparation of 2,3-diphenyl-1-methylindole by similarly condensing N-methylaniline and desyl bromide (2-bromo-2-phenylacetophenone)].

Still another process for the preparation of a 1-methyl-2,3-bis(p-methoxyphenyl)indole of Formula I involves reacting a 1-unsubstituted 2,3-bis(p-methoxyphenyl)indole (R in Formula I is hydrogen) with an alkaline condensing agent such as an alkali-metal amide or hydride (e.g., sodium amide, potassium amide, lithium amide, sodium hydride, and the like) and then reacting the resulting 1-alkali-metal salt of the 2,3-bis(p-methoxyphenyl)indole with a methyl halide, e.g., methyl iodide, methyl bromide, or the like.

The novel compounds of Formula I wherein R is alkanoyl of two to four carbons, inclusive, e.g., acetyl, propionyl, butyryl, or isobutyryl, can be prepared by utilizing the reaction conditions set forth in U.S. Patent 3,161,654. Thus, the 1-alkanoyl derivatives can be prepared by reacting a 1-unsubstituted 2,3-bis(p-methoxyphenyl)indole (R in Formula I is hydrogen) with an alkali-metal hydride, e.g., sodium hydride, and reacting the resulting 1-alkali-metal salt of the 2,3-bis(p-methoxyphenyl)indole with an alkanoyl halide, e.g., acetyl chloride, propionyl chloride, butyryl chloride, and the like, in an anhydrous solvent medium. Anhydrous solvents such as dimethylformamide, benzene, toluene or xylene can be employed.

The novel compounds of Formula I wherein R is alkanoyl of one to four carbon atoms, inclusive, can also be prepared by reacting a 1-unsubstituted 2,3 - bis(p-methoxyphenyl)indole (R in Formula I is hydrogen) with an alkanoic anhydride, e.g., acetic anhydride, propionic anhydride, butyric anhydride, isobutyric anhydride or formic acetic anhydride, in the presence of an alkali-metal alkanoate, e.g., the sodium or potassium salt of the alkanoic acid corresponding to the alkanoyl group to be introduced in the 1-position of the indole nucleus. Thus, e.g., acetic anhydride and sodium acetate; propionic anhydride and sodium propionate; formic acetic anhydride and sodium formate, and the like, can be employed.

An alternate procedure for the preparation of novel compounds of Formula I wherein R is alkanoyl of one to four carbon atoms, inclusive, involves reacting a 1-unsubstituted 2,3-bis(p-methoxyphenyl)indole (R in Formula I is hydrogen) with a Grignard reagent, e.g., methylmagnesium bromide, and then reacting the resulting indole Grignard compound with an alkyl alkanoate in which the alkanoyl moiety corresponds to the alkanoyl group to be introduced in the 1-position of the indole nucleus. Examples of suitable alkyl alkanoates are methyl acetate, ethyl propionate, ethyl butyrate, methyl isobutyrate, methyl formate, and the like.

Another alternative process for the preparation of the 1-acetyl, 1-propionyl, 1-butyryl, and 1-isobutyryl compounds of Formula I involves reacting the indole Grignard compound prepared as described above, with an alkanoyl halide, e.g., acetyl chloride, propionyl chloride, butyryl chloride, and the like.

The following examples are illustrative of the process and products of the present invention but are not to be construed as limiting.

EXAMPLE 1

2,3-bis(p-methoxyphenyl)indole

A mixture of phenylhydrazine (53 g.; 0.49 mole), deoxyanisoin (125 g.; 0.49 mole), glacial acetic acid (4.3 ml.) and 530 ml. of benzene was refluxed for three hours, using an azeotropic separator; 9.2 ml. of water was collected. The solution was evaporated to dryness. Ethanolic hydrogen chloride (960 ml. of 3 N) was added, the mixture was refluxed for 1.25 hr., evaporated to dryness, and 40 ml. of water and 400 ml. of methylene chloride were then added. After shaking, the layers were separated and the aqueous layer was extracted with 200 ml. of methylene chloride. The combined methylene chloride extract and original layer were washed with water (2 portions, each 200 ml.), 5% aqueous sodium hydroxide solution (3 portions, each 100 ml.) and saturated sodium chloride solution (200 ml.). The washed methylene chloride solution was then dried by passage through anhydrous sodium sulfate (about 300 g.) and evaporated to dryness to give 170 g. of a brown oil. The oil was dissolved in 300 ml. of methylene chloride and chromatographed on 3 kg. of diatomaceous earth which occupied the space of 8 cm. x 100 cm. on a column. Methylene chloride was used as eluant and 400-ml. fractions were collected. The first eight fractions did not contain the desired compound. The next nine fractions gave 82.5 g. of product which was recrystallized from about 500 ml. of absolute ethanol, filtered, washed with ethanol, and dried to constant weight under vacuum at 60° C. to give 60.4 g. of 2,3-bis(p-methoxyphenyl)indole which melted between 151–152° C.

*Analysis.*—Calcd. for $C_{22}H_{19}NO_2$: C, 80.22; H, 5.81; N, 4.25. Found: C, 79.90; H, 5.85; N, 4.15.

2,3-bis(p-methoxyphenyl)indole was also prepared by condensing p-anisoin with aniline using the one-step process described above.

EXAMPLE 2

5-methoxy-2,3-bis(p-methoxyphenyl)indole

To a solution of deoxyanisoin (25.6 g.; 0.1 mole) in benzene (1 l.) was added p-methoxyphenylhydrazine (14.6 g.; 0.106 mole) and 2 ml. of glacial acetic acid. The resulting solution was refluxed under nitrogen for one hour with azeotropic distillation of the water formed during the reaction. Concentration of the reaction mixture under reduced pressure yielded an oil which was treated with 250 ml. of 3 N ethanolic hydrogen chloride. The resulting solution was refluxed for one hour, cooled, and treated with water (1.2 l.). This mixture was extracted with methylene chloride (3 portions, each 500 ml.). The combined extracts were washed with water (400 ml.), dried over anhydrous magnesium sulfate, and concentrated under reduced pressure. Chromatography of the residue on diatomaceous earth (1.6 kg.) with methylene chloride yielded 20 g. (53.5%) of crude product which was recrystallized twice from ethanol to yield 12.3 g. of 5 - methoxy-2,3-bis(p-methoxyphenyl)indole which melted between 170–171° C.

*Analysis.*—Calcd. for $C_{23}H_{21}NO_3$: C, 76.86; H, 5.89; N, 3.90. Found: C, 76.49; H, 5.94; N, 3.70.

In the same manner as shown above, 5-ethoxy-2,3-bis(p-methoxyphenyl)indole, 5-propoxy-2,3-bis(p-methoxyphenyl)indole, 7 - methoxy - 2,3-bis(p-methoxyphenyl)indole (crystallized from methylene chloride-ethanol and melting between 169–170° C.), 7 - ethoxy-2,3-bis(p-methoxyphenyl)indole, and 7 - propoxy - 2,3 - bis(p-methoxyphenyl)indole are prepared by substituting p-ethoxyphenylhydrazine, p - propoxyphenylhydrazine, o-methoxyphenylhydrazine, o-ethoxyphenylhydrazine, and o-propoxyphenylhydrazine, respectively, for p-methoxyphenylhydrazine.

EXAMPLE 3

4-methoxy-2,3-bis(p-methoxyphenyl)indole and 6-methoxy-2,3-bis(p-methoxyphenyl)indole To a stirred mixture of 3 N sodium hydroxide (100 ml.) and ether (100 ml.), cooled to 0° C., was added 20.5 g. (0.115 mole) of m-methoxyphenylhydrazine hydrochloride (Alberti et al., Farmaco Ed. Sci. 17, 443, 1962). The aqueous layer was saturated with sodium chloride, separated from the ether layer, and extracted twice with 200-ml. portions of ether. The combined ether extracts and original layer were washed with 50 ml. of saturated sodium chloride solution, dried over anhydrous magnesium sulfate, and concentrated under reduced pressure at 25° C. A solution of the resulting light yellow, oily, m-methoxyphenylhydrazine in benzene (1 l.) was treated with 25.6 g. (0.1 mole) of deoxyanisoin and 2 ml. of glacial acetic acid. The resulting solution was refluxed under nitrogen for 30 minutes with azeotropic distillation of water, and concentrated under reduced pressure at 35° C. The residue was treated with ice-cold 3 N ethanolic hydrogen chloride (200 ml.); the mixture was refluxed for 30 minutes under nitrogen, cooled, and treated with 1 liter of ice water. This mixture was extracted with methylene chloride (4 portions, each 500 ml.). The combined methylene chloride extracts were washed with saturated sodium chloride solution (500 ml.), dried over anhydrous magnesium sulfate, and concentrated under reduced pressure at 35° C. Chromatography of the residue on diatomaceous earth (1.5 kg.) with methylene chloride resulted in a preliminary purification of two isomeric compounds. A separation of these compounds was obtained by careful chromatography on silica gel (1.2 kg.) with 20% ethyl acetate-cyclohexane (200 fractions, each 50 ml., were collected). The first product eluted from the column (fractions 40–69) was dissolved in methylene chloride-ethanol, decolorized with charcoal, and crystallized to yield 1.06 g. of 4 - methoxy - 2,3 - bis(p - methoxyphenyl)indole which melted between 164.5–165.5° C.

*Analysis.*—Calcd. for $C_{23}H_{21}NO_3$: C, 76.86; H, 5.89; N, 3.90. Found: C, 77.00; H, 5.98; N, 3.96.

The second product eluted from the column (fractions 83–200) was crystallized from methylene chloride-ethanol to yield 11.88 g. (33.1%) of 6 - methoxy - 2,3-bis(p - methoxyphenyl) indole which melted between 183.5–184.5° C.

*Analysis.*—Calcd. for $C_{23}H_{21}NO_3$: C, 76.86; H, 5.89; N, 3.90. Found: C, 76.40; H, 5.99; N, 3.97.

In the same manner as shown above, 4 - ethoxy-2,3-bis(p - methoxyphenyl)indole and 6 - ethoxy - 2,3 - bis (p - methoxyphenyl) indole; and 4 - propoxy - 2,3 - bis (p - methoxyphenyl)indole and 6 - propoxy - 2,3 - bis (p - methoxyphenyl)indole are prepared by substituting m - ethoxy - phenylhydrazine hydrochloride and m-propoxyphenylhydrazine hydrochloride, respectively, for m - methoxyphenylhydrazine hydrochloride.

EXAMPLE 4

7-methyl-2,3-bis(p-methoxyphenyl)indole

A mixture of deoxyanisoin (25.6 g.; 0.1 mole), o-tolyl-hydrazine (14.1 g.; 0.115 mole—prepared from the commercial hydrochloride by treatment with sodium hydroxide followed by ether extraction), benzene (1 l.), and glacial acetic acid (2 ml.) was refluxed under nitrogen for 45 minutes with azeotropic distillation of the water formed during the reaction. The solution was concentrated under reduced pressure at 35° C. and the residue was treated with 200 ml. of ice-cold 3 N ethanolic hydrogen chloride. This mixture was refluxed for one hour, poured into 1 liter of ice water, and extracted with methylene chloride (3 portions, each 500 ml.). The combined methylene chloride extracts were washed with water (500 ml.), dried over anhydrous magnesium sulfate, and concentrated under reduced pressure. Chromatography of the residue on diatomaceous earth (1.5 kg.) with methylene chloride (4 l.) gave a crude product which was recrystallized twice from methylene chloride-ethanol to yield 3.83 g. of 7 - methyl - 2,3 - bis(p-methoxyphenyl-indole which melted between 124–125° C.

*Analysis.*—Calcd. for $C_{23}H_{21}NO_2$: C, 80.44; H, 6.16; N, 4.08. Found: C, 80.55; H, 6.21; N, 4.23.

In the same manner as shown above, 7 - ethyl - 2,3-bis(p - methoxyphenyl)indole, 7 - propyl - 2,3 - bis(p-methoxyphenyl)indole, 5 - methyl - 2,3 - bis(p-methoxyphenyl)indole (crystallized from ethanol and melting between 161–162° C.), 5 - isopropyl - 2,3 - bis(p - methoxyphenyl)indole, and 5 - ethyl - 2,3 - bis(p - methoxyphenyl)indole are prepared by substituting o - ethylphenylhydrazine, o - propylphenylhydrazine, p - tolylhydrazine, p - isopropylphenylhydrazine, and p - ethylphenylhydrazine, respectively, for o - tolylhydrazine.

EXAMPLE 5

5-fluoro-2,3-bis(p-methoxyphenyl)indole

To a stirred mixture of 3 N sodium hydroxide (100 ml.) and ether (100 ml.), cooled to 0° C., was added p - fluorophenylhydrazine hydrochloride (17.2 g.; 0.105 mole). The aqueous layer was saturated with sodium chloride, separated from the ether layer, and extracted twice with 200-ml. portions of ether. The combined ether extracts and original layer were washed with 50 ml. of saturated sodium chloride solution, dried over anhydrous magnesium sulfate, and concentrated under reduced pressure at 25° C. A solution of the resulting p-fluorophenylhydrazine in benzene (600 ml.) was treated with deoxyanisoin (25.6 g.; 0.1 mole) and glacial acetic acid (2.0 ml.) and the mixture was refluxed for one hour with azeotropic distillation of water. The benzene was removed under reduced pressure at 35° C. The residue was dissolved in 100 ml. of ethanol, and the solution was cooled in an ice bath, treated with 100 ml. of 6 N ethanolic hydrogen chloride, and refluxed for 45 minutes. Concentration of the resulting dark mixture yielded an oil which was treated with water (800 ml.). The aqueous mixture was extracted with methylene chloride (3 portions, each 250 ml.). The combined methylene chloride extracts were washed with saturated sodium chloride solution, dried over anhydrous magnesium sulfate, and concentrated under reduced pressure. Chromatography of the residue on diatomaceous earth (1500 g.) with methylene chloride gave a product which was crystallized from methylene chloride-ethanol to yield 4.5 g. of 5-fluoro - 2,3 - bis(p - methoxyphenyl)indole which melted between 129–130° C.

*Analysis.*—Calcd. for $C_{22}H_{18}FNO_2$: C, 76.06; H, 5.22; F, 5.47; N, 4.0. Found: C, 75.86; N, 5.17; F, 5.29; N, 4.07

In the same manner as shown above, 5 - bromo - 2,3-bis(p - methoxyphenyl)indole, 5 - chloro - 2,3 - bis(p-methoxyphenyl)indole (crystallized from ethanol and melting between 165–166° C.), and 5 - iodo - 2,3 - bis (p - methoxyphenyl)indole are prepared by substituting p - bromophenylhydrazine, p - chlorophenylhydrazine, and p - iodophenylhydrazine, respectively, for p- fluorophenylhydrazine.

EXAMPLE 6

7-fluoro-2,3-bis(p-methoxyphenyl)indole o-Fluorophenylhydrazine hydrochloride (Suchitzky, J. Chem. Soc., 3326, 1953) was converted to the free base by reaction with 3 N sodium hydroxide. A solution of the resulting o-fluorophenylhydrazine (10.08 g.; 0.08 mole) in benzene (600 ml.) was treated with 20.0 g. (0.078 mole) of deoxyanisoin and 2.0 ml. of glacial acetic acid and refluxed for one hour with azeotropic distillation of water. The benzene was removed under reduced pressure at 35° C. A solution of the residue in ethanol (10 ml.) was cooled in an ice bath, treated with 6 N ethanolic hydrogen chloride (100 ml.), and refluxed for one hour. Concentration of the resulting mixture gave a dark oil which was treated with water (700 ml.). The aqueous mixture was extracted with methylene chloride (3 portions, each 250 ml.). The combined methylene chloride extracts were washed with saturated sodium chloride solution, dried over anhydrous magnesium sulfate, and concentrated under reduced pressure. Chromatography of the residue on diatomaceous earth (1500 g.) with methylene chloride gave a product which was crystallized from methylene chloride-ethanol to yield 1.57 g. of 7-fluoro-2,3-bis(p-methoxyphenyl)indole which melted between 159–159.5° C.

*Analysis.*—Calcd. for $C_{22}H_{18}FNO_2$: C, 76.06; H, 5.22; F, 5.47; N, 4.03. Found: C, 76.25; H, 5.31; F, 4.90; N, 4.04.

In the same manner as shown above, 7-bromo-2,3-bis-(p-methoxyphenyl)indole, 7-chloro-2,3-bis (p-methoxyphenyl)indole, and 7-iodo-2,3-bis(p-methoxyphenyl)indole are prepared by substituting o-bromophenylhydrazine, o-chlorophenylhydrazine, and o-iodophenylhydrazine, respectively, for o-fluorophenylhydrazine.

EXAMPLE 7

4-methyl-2,3-bis(p-methoxyphenyl)indole and 6-methyl-2,3-bis(p-methoxyphenyl)indole In the same manner as shown in Example 3, 4-methyl-2,3-bis(p-methoxyphenyl)indole and 6-methyl-2,3-bis(p-methoxyphenyl)indole are prepared by substituting m-tolylhydrazine hydrochloride for m-methoxyphenylhydrazine hydrochloride.

Similarly, 4-ethyl-2,3-bis(p-methoxyphenyl)indole and 6-ethyl-2,3-bis(p-methoxyphenyl)indole; and 4-propyl-2,3-bis(p-methoxyphenyl)indole and 6-propyl-2,3-bis(p-methoxyphenyl)indole are prepared by substituting m-ethylphenylhydrazine hydrochloride and m-propylphenylhydrazine hydrochloride, respectively, for m-methoxyphenylhydrazine hydrochloride.

EXAMPLE 8

4-fluoro-2,3-bis(p-methoxyphenyl)indole and 6-fluoro-2,3-bis(p-methoxyphenyl)indole In the same manner as shown in Example 3, 4-fluoro-2,3-bis(p-methoxyphenyl)indole and 6-fluoro-2,3-bis(p-methoxyphenyl)indole are prepared by substituting m-fluorophenylhydrazine hydrochloride for m-methoxyphenylhydrazine hydrochloride.

Similarly, 4 - bromo-2,3-bis(p-methoxyphenyl)indole and 6-bromo-2,3-bis(p-methoxyphenyl)indole; 4-chloro-2,3-bis(p-methoxyphenyl)indole and 6-chloro-2,3-bis(p-methoxyphenyl)indole; and 4 - iodo-2,3-bis(p-methoxyphenyl)indole and 6-iodo-2,3 - bis(p-methoxyphenyl)indole are prepared by substituting m-bromophenylhydrazine hydrochloride, m-chlorophenylhydrazine hydrochloride, and m-iodophenylhydrazine hydrochloride, respectively, for m-methoxyphenylhydrazine hydrochloride.

EXAMPLE 9

1-acetyl-2,3-bis(p-methoxyphenyl)indole

Sodium hydride in the form of a 53% suspension in mineral oil (0.46 g. of suspension containing 10 millimoles of the hydride) was added, under a nitrogen atmosphere, to a stirred solution of 2,3-bis(p-methoxyphenyl)indole (3.3 g.; 10 millimoles) in 50 ml. of dimethylformamide. The mixture was stirred for two hours, acetyl chloride (0.785 g.; 10 millimoles) was added, and stirring was continued for an additional 24 hours. The mixture was evaporated to dryness under reduced pressure. The residue was thoroughly mixed with 50 ml. of water and 50 ml. of diethyl ether, and the layers were separated. The organic layer was washed successively with 25 ml. of water and two 25-ml. portions of saturated aqueous sodium chloride solution. The washed solution was dried with anhydrous sodium sulfate and evaporated to dryness. The yellow powder thus obtained was washed with petroleum ether (boiling range 30–60° C.) to remove mineral oil. The residue (3.2 g.) was chromatographed on 96 g. of silica gel, using ethyl acetate-cyclohexane (1:4 by volume). The first 200 ml. of eluate was discarded. The next 200 ml. of eluate was evaporated to dryness. There was thus obtained 2.33 g. of 1-acetyl-2,3-bis(p-methoxyphenyl)indole, which on recrystallization from diethyl ether melted between 146.5–148° C.

*Analysis.*—Calcd. for $C_{24}H_{21}NO_3$: C, 77.60; H, 5.70; N, 3.77. Found: C, 77.32; H, 5.96; N, 3.74.

In the same manner as shown above, 1-propionyl-2,3-bis(p-methoxyphenyl)indole, 1 - butyryl - 2,3-bis(p-methoxyphenyl)indole, and 1 - isobutyryl-2,3-bis(p-methoxyphenyl)indole are prepared by substituting propionyl chloride, butyryl chloride, and isobutyryl chloride, respectively, for acetyl chloride.

In the same manner as shown above, 1-acetyl-4-methoxy-2,3-bis(p-methoxyphenyl)indole, 1-acetyl - 5 - methoxy-2,3 - bis(p-methoxyphenyl)indole, 1 - acetyl-6-methoxy-2,3-bis(p-methoxyphenyl)indole, 1-acetyl-7-methoxy-2,3-bis-p-methoxyphenyl)indole, 1-acetyl-5-methyl-2,3-bis(p-methoxyphenyl)indole, 1 - acetyl-7-methyl-2,3-bis(p-methoxyphenyl)indole, 1-acetyl-5-fluoro-2,3-bis(p-methoxyphenyl)indole, 1-acetyl-7-fluoro-2,3-bis(p-methoxyphenyl)indole, and 1-acetyl-5-chloro-2,3-bis(p-methoxyphenyl)indole are prepared by substituting 4-methoxy-2,3-bis(p-methoxyphenyl)indole, 5-methoxy-2,3-bis(p-methoxyphenyl)indole, 6 - methoxy-2,3-bis(p-methoxyphenyl)indole, 7-methoxy-2,3-bis(p-methoxyphenyl)indole, 5-methyl-2,3-bis(p-methoxyphenyl)indole, 7 - methyl-2,3-bis(p-methoxyphenyl)indole, 5-fluoro-2,3-bis(p-methoxyphenyl)indole, 7-fluoro-2,3-bis(p-methoxyphenyl)indole, and 5 - chloro-2,3-bis(p-methoxyphenyl)indole, respectively, for 2,3-bis(p-methoxyphenyl)indole.

EXAMPLE 10

1-methyl-2,3-bis(p-methoxyphenyl)indole

A mixture of deoxyanisoin (58.8 g.; 0.23 mole), 1-methyl-1-phenylhydrazine (28.0 g.; 0.23 mole), 2 ml. of glacial acetic acid, and 250 ml. of benzene was refluxed under nitrogen for seven hours using an azeotropic separator; 4 ml. of water was collected. The solution was allowed to stand for 16 hours, and the resulting suspension was evaporated to dryness under reduced pressure. Ethanolic hydrogen chloride (450 ml. of 3 N) was added and the mixture was heated on the steambath for 75 min., evaporated to dryness under reduced pressure, and 200 ml. of water was then extracted with methylene chloride (4 portions, each 100 ml.). The combined methylene chloride extracts were washed successively with water, 5% aqueous sodium hydroxide solution, and saturated sodium chloride solution, and then dried by passage through anhydrous sodium sulfate and evaporated to dryness. The resulting crude product was dissolved in methylene chloride and passed through a column containing 2 kg. of Florisil (synthetic magnesia silica gel). Elution with 12 portions, each 400 ml., of methylene chloride gave 24.3 g. of product. The product was crystallized from ethanol to give 18.3 g. (23% yield) of 1-methyl-2,3-bis(p-methoxyphenyl)indole which melted between 127–129.5° C.

*Analysis.*—Calcd. for $C_{23}H_{21}NO_2$: C, 80.44; H, 6.16; N, 4.08. Found: C, 80.83; H, 5.84; N, 4.23.

In the same manner as shown in Example 10, 1-methyl-5-methoxy - 2,3-bis(p-methoxyphenyl)indole, 1-methyl-7-methoxy - 2,3-bis(p-methoxyphenyl)indole, 1,5-dimethyl-2,3-bis(p-methoxyphenyl)indole, 1,7-dimethyl-2,3-bis(p-methoxyphenyl)indole, 1-methyl-5-fluoro-2,3 - bis(p-methoxyphenyl)indole, 1-methyl-5-fluoro - 2,3 - bis(p-methoxyphenyl)indole, 1-methyl-7-fluoro-2,3-bis(p-methoxyphenyl)indole are prepared by substituting 1-methyl-1-(p-methoxyphenyl)hydrazine, 1-methyl - 1 - (o-methoxyphenyl)hydrazine, 1-methyl - 1 - (p-tolyl)hydrazine, 1-phenyl)hydrazine, 1 - methyl - 1 - (o-tolyl)hydrazine, 1-methyl-1-(o-tolyl)hydrazine, 1-methyl-1-(p-fluorophenyl) hydrazine, 1-methyl-1-(p-chlorophenyl) hydrazine, and 1-methyl-1-(o-fluorophenyl)hydrazine, respectively, for 1-methyl-1-phenylhydrazine.

In the same manner as shown in Example 3, 1-methyl-)4-methoxy-2,3-bis(p-methoxyphenyl)indole and 1-methyl-6-methoxy-2,3-bis(p-methoxyphenyl)indole are prepared by substituting 1-methyl-1-(m-methoxyphenyl)hydrazine hydrochloride for m-methoxy-phenylhydrazine hydrochloride.

EXAMPLE 11

1-formyl-2,3-bis(p-methoxyphenyl)indole

Magnesium (2.4 g.; 0.1 mole) was converted in an conventional manner to methylmagnesium iodide using methyl iodide (14.2 g.; 0.1 mole), a crystal of iodine, and 10 ml. of anisole. A solution of 2,3-bis(p-methoxyphenyl)indole (3.29 g.; 0.1 mole) in 10 ml. of anisole was added, and the mixture was stirred for 1 hr. at 25° C. Ethyl formate (7.4 g.; 0.1 mole) was added with ice-cooling. The mixture was stirred for 16 hours at 25° C. and then cooled in an ice-bath and 10 ml. of water was added. The organic layer was decanted, and the aqueous layer was extracted with methylene chloride. The combined organic layer and extract was washed water and then with saturated sodium chloride solution, dried over magnesium sulfate, and evaporated to give the desired product, 1-formyl-2,3-bis(p-methoxyphenyl)indole.

In the same manner as shown above, 1-formyl-4-methoxy - 2,3 - bis(p-methoxyphenyl)indole, 1-formyl-5-methoxy - 2,3 - bis(p-methoxyphenyl)indole, 1-formyl-6-methoxy - 2,3 - bis(p-methoxyphenyl)indole, 1-formyl-7-methoxy - 2,3 - bis(p-methoxyphenyl)indole, 1-formyl-5-methyl - 2,3 - bis(p-methoxyphenyl)indole, 1-formyl-7-methyl - 2,3 - bis(p-methoxyphenyl)indole, 1-formyl-5-fluoro-2,3-bis(p-methoxyphenyl)indole, 1-formyl-7-fluoro-2,3-bis(p-methoxyphenyl)indole, and 1-formyl-5-chloro-2,3-bis(p-methoxyphenyl)indole are prepared by substituting 4-methoxy - 2,3 - bis(p-methoxyphenyl)indole, 5-methoxy-2,3-bis(p-methoxyphenyl)indole, 6-methoxy-2,3-bis(p-methoxyphenyl)indole, 7-methoxy-2,3-bis(p-methoxyphenyl)indole, 5-methyl-2,3-bis(p-methoxyphenyl)indole, 7-methyl-2,3-bis(p-methoxyphenyl)indole, 5-fluoro-2,3 - bis(p-methoxyphenyl)indole, 7-fluoro - 2,3 - bis(p-methoxyphenyl)indole, and 5-chloro-2,3-bis(p-methoxyphenyl)indole, respectively, for 2,3 - bis (p - methoxyphenyl)indole.

The compounds of the present invention are anti-inflammatory, analgesic and antipyretic agents useful in birds and mammals. The compounds are useful topically, orally and parenterally for the relief of rheumatic, allergic, dermatological and ocular conditions generally responsive to anti-inflammatory agents, and for the relief of pain and fever.

More specifically, the compositions of the present invention are useful for the reduction of swelling in gouty arthritis, rheumatoid arthritis, rheumatoid spondylitis, osteoarthritis psoriatic arthritis, acute superficial thrombophlebitis and painful shoulder syndromes such as peritendinitis, capsulitis, bursitis, and acute shoulder arthritis and for the relief of pain and fever.

The novel compositions also find application in the local treatment of inflammatory conditions in animal mastitis, a disease of the mammary glands which can be of particular concern in milk-producing animals such as cows.

The compounds of the present invention in the treatment of inflammatory conditions compare more than favorably with phenylbutazone, an accepted non-steroid employed in the treatment of gout, rheumatoid arthritis, ankylosing spondylitis and other inflammatory conditions. Thus, e.g., in the hind paw edema assay utilizing both intact and adrenalectomized rats, 2,3-bis(p-methoxyphenyl)indole in a 1% aqueous sodium carboxymethylcellulose vehicle is about 2.6 times as active as phenylbutazone.

In the hind paw edema assay, male rats, intact or adrenalectomized, weighing about 160-200 grams are fasted for about 14 hours. Animals (5 per group) are dosed orally with 1.0 ml. of a suspension of the test compound prepared in a 1% aqueous sodium carboxymethylcellulose vehicle or with 1.0 ml. of a solution in dimethyl sulfoxide vehicle one hour prior to injection of 0.1 ml. of 0.5% aqueous carrageenin into the right hind paw. The left hind paw serves as a control. Five hours after carrageenin injection both paws are amputated and weighed. The ability of compounds to inhibit carrageenin-induced edema is considered to be of value in determining efficacy of potential anti-inflammatory therapeutic agents.

2,3-bis(p-methoxyphenyl)indole, moreover, is also considerably less toxic than phenylbutazone. In rats, the compound is less than one-fifth as toxic as phenylbutazone; the acute oral $LD_{50}$ is >2400 mg./kg. compared with 340 mg./kg. for phenylbutazone. In mice, the compound is less than one-tenth as toxic as phenylbutazone; the acute oral $LD_{50}$ is >3500 mg./kg. compared with 350-400 mg./kg. for phenylbutazone. Moreover, the compound has advantageously shown no indication of inducing ulcer or ulcer bleeding in contrast to phenylbutazone or other presently employed anti-inflammatory agents.

Also, the therapeutic activity ratio of 2,3-bis(p-methoxyphenyl)indole is superior to that of phenylbutazone. Thus, in Table I, below, utilizing the hind paw edema assay in rats, 2,3-bis(p-methoxyphenyl)indole (I) is shown to have a therapeutic activity ratio 18 times phenylbutazone (II), utilizing dimethyl sulfoxide as the vehicle for both drugs.

TABLE I

| | Acute Oral $LD_{50}$, mg./kg. | $ID_{50}$[1] (mg./kg.) | Therapeutic Index[2] | Comparative Therapeutic Activity[3] |
|---|---|---|---|---|
| I | >2,400 | 15 | >160 | 18×phenylbutazone. |
| II | 340 | 40 | 8.5 | |

[1] That dose inhibiting edema 25% (50% of maximal).
[2] $LD_{50}/ID_{50}$.
[3] Therapeutic Index of I/Therapeutic Index of II.

2,3-bis(p-methoxyphenyl)indole is also superior to phenylbutazone as an antipyretic agent. Tests carried out on rats with yeast-induced fever indicate that 2,3-bis(p-methoxyphenyl)indole is about 1.9 times as potent as phenylbutazone three hours after dosing and 2.7 times as potent as phenylbutazone seven hours after dosing. The antipyretic tests are carried out by injecting rats with a suspension of brewer's yeast which brings about an elevation in body temperature, fasting the animals for about 16 hours, determining body temperatures by means of intraperitoneal probe, orally administering the test compound in 1% aqueous sodium carboxymethylcellulose or other vehicle, and again determining body temperatures.

The pharmaceutical forms contemplated by this invention include pharmaceutical compositions suited for topical, oral, parenteral and rectal use.

The term "unit dosage form" as used herein refers to physically discrete units suitable as unitary dosages, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved and (b) the limitations inherent in the art of compounding such an active material for therapeutic use, as disclosed in detail in this specification, these being features of the present invention. Examples of suitable unit dosage forms, as herein described, are tablets, capsules, pills, powder packets, wafers, cachets, granules, solutions or suspension for oral or sterile injectable use, suppositories, and segregated multiples of any of the foregoing, and other forms alluded to herein.

The term "topical" as employed herein relates to the use of the medication, incorporated in a suitable base or vehicle, at the site of the inflammation for exertion of local action. Accordingly, such topical compositions include those pharmaceutical forms in which the medication is applied externally by direct contact with the surface to be treated. Conventional pharmaceutical forms for this purpose include ointments, lotions, pastes, jellies, sprays, powders, and the like. The term "ointment" embraces formulations (including creams) having oleaginous, absorption, water-soluble and emulsion-type bases, e.g., petrolatum, lanolin, polyethylene glycols, as well as mixtures of these. Topical compositions as herein defined also include those pharmaceutical forms which afford local as opposed to systemic release into the immediately affected areas where such areas are not accessible for direct external application, such forms being sprays (e.g., for oral or nasal use), aerosols (e.g., for deeper penetration than is usually afforded by a spray), drops (e.g., for use in the eyes and ears), suppositories (e.g., for rectal or vaginal use), and powders (e.g., for insufflation).

The oral dosage forms include both solid and liquid. Solid unit dosage forms can be in the form of tablets, coated or uncoated; capsules, hard or soft; powders; granules; pills, and the like. Suitable diluents or carriers for such compositions include lipids, carbohydrates, proteins and mineral solids.

The tablets for oral contain the active ingredient in the required amount with pharmaceutical diluents or excipients, binders, disintegrators, and lubricants. The active ingredient is suitably comminuted with a carbohydrate diluent (e.g., lactose), a mineral solid (e.g., calcium sulfate and dicalcium phosphate), and the like, to form the basic powder mixture. The said mixture can be granulated by wetting with a protein binder such as gelatin solution, or a carbohydrate such as acacia mucilage and corn syrup, and is then screened to desired particle sizes. As an alternative to granulating, the mixtures can be "slugged" and the slugs broken down into suitable size granules prior to compression of the final tablets. A carbohydrate disintegrating agent (e.g., cornstarch) is advantageously added at the time of preparing the basic mixture. The lubricant, for example, a lipid (such as stearic acid, a stearate salt or mineral oil), a mineral solid (such as talc), and the like, is used to prevent sticking of the mixture to the tablet-forming dies. The tablets can be coated or left uncoated. Suitable coatings include a sealing coat of shellac, a taste-disguising coating (such as sugar or methylcellulose), and a lipid polish coating such as carnauba wax. Special coatings can comprise (a) lipid-type coatings of a semipermeable nature for delaying absorption of the active ingredient to provide sustained action, or (b) enteric substances (such as styrene-maleic acid copolymer and cellulose acetate phthalate) to resist release of the active ingredient in the stomach and permit release in the upper intestine.

The capsules for oral use can comprise a mixture of the active ingredient in combination with a pharmaceutical diluent and a gelatin sheath enclosing said mixture. The capsules can be in the form of soft capsules enclosing the active ingredient in the required amount, e.g., soft elastic capsules can be filled with the drug in solution or suspension in oil, oil-organic solvent, polysorbate 80 or polysorbate 80-oil mixture. Hard capsules can also be prepared comprising mineral solids (e.g., talc or calcium sulfate) and, optionally, lubricants (e.g., calcium or magnesium stearate) with the required amount of the drug.

The powders for oral use are conveniently prepared by comminuting the active ingredient and mixing with an acceptable diluent (e.g., an edible carbohydrate such as lactose) and advantageously include sweetening and flavoring agents (such as sugar, saccharin, a cyclamate salt or flavoring oil).

Pills for oral use include the required amount of the active ingredient plus suitable diluents, binders, disintegrators and lubricants as heretobefore set forth with respect to tablets and capsules. The pills are suitably prepared by the rolling technique or other known methods, advantageously with the use of the aforesaid lubricants.

For the treatment of domestic birds and mammals by oral administration, the therapeutic ingredient is conveniently prepared in the form of a food premix. The food premix can comprise the active ingredient in admixture with an edible diluent such as starch, oatmeal, flour, calcium carbonate, talc, dried fish meal and the like nontoxic, orally-acceptable diluents. The prepared premix is then conveniently added to the regular feed, thereby supplying the included medication to the animal or bird in the course of feeding.

The liquid compositions for oral use can be in the form of suspensions, emulsions, or solutions, in aqueous and non-aqueous vehicles such as edible vegetable oils.

The emulsions are preferably of the oil-in-water type and contain the active ingredient in the required amount with acceptable emulsifying agents, such as gum acacia, gum tragacanth, naturally-occurring phosphatides, and the like. Suitable sweetening, coloring, and flavoring agents are added to the aqueous phase of the emulsion. Under ordinary conditions of storage and use, the emulsions are kept free from microorganism growth by the addition of a preservative, such as methylparaben and propylparaben.

Solutions for oral use of the active ingredient can be prepared in an edible vegetable oil such as in corn oil, cottonseed oil, peanut oil, coconut oil, sesame oil, safflower oil, and the like. To increase the amount of active material dissolved in the oil, the drug can be dissolved first in about 5 to 25% of an oral, pharmaceutically acceptable organic solvent such as N,N-dimethylacetamide, or 2,2-dimethyl-4-carbinol-1,3-dioxolane. Antioxidants can be added. Alternatively, solutions can be prepared in any of the above organic solvents or mixtures of these. Sweetening, coloring, and flavoring agents are added to assure patient acceptance.

Suspensions for oral use are conveniently prepared in water and aqueous solutions of orally acceptable liquids, such as ethanol, glycerol, sorbitol, propylene glycol and polyethylene glycols. The active ingredient is normally comminuted to a fine particle size for use in the suspensions, which can also contain soluble suspending agents, such as sodium carboxymethylcellulose, methylcellulose, acacia, tragacanth, polyvinylpyrrolidone, polyvinyl alcohol, and the like. As with the other liquid oral compositions, preservatives, coloring agents, sucrose and other sweeteners, and flavoring agents are added for convenience in storage and use.

It has been noted that good blood levels of oral preparations can be obtained by utilizing the active drug in a fine particle size of about 10 microns or less and more preferably, less than 1 micron. Illustratively, a 2,3-bis(p-methoxyphenyl)indole of Formula I having fine particle size can be prepared by slowly adding, with good agitation, an absolute ethanol solution of a pure Formula I compound to cold water (e.g., about 1 to 5° C.), and separating the resulting fine precipitate.

Moreover, blood levels are also greatly increased when the active compound is given orally as a dispersion in one of the above non-aqueous vehicles, particularly when given in an edible vegetable oil such as cottonseed oil, corn oil, safflower oil, sesame oil, peanut oil, olive oil, coconut oil, and the like. A higher concentration of the active compound in solution in the vegetable oil can be obtained by first dissolving the active compound in a non-toxic, pharmaceutically acceptable organic solvent, e.g., N,N-dimethylacetamide, or 2,2-dimethyl-4-carbinol-1,3-dioxolane, and then diluting the solution with the oil. The final vehicle may contain up to about 50% v./v. or more of the organic solvent, depending on the concentration of active compound desired, and preferably about 5 to 25% of organic solvent.

Improved blood levels of the active compound can also be obtained by adding a surfactant such as Aerosol OT or Aerosol OTB, polysorbate 80, sodium lauryl sulfate, Pluronic F68, and the like, to oral preparations. Aerosol OTB is particularly suitable for use with the finely powdered drug in tablets or hard gelatin capsules and polysorbate 80 is particularly useful with solutions of the drug in oil, organic solvent, or oil-organic solvent. Improved blood levels can also be obtained by utilizing the surfactant alone with the active compound. Thus, e.g., a solution of 2,3-bis-(p-methoxyphenyl)indole in polysorbate 80 in a soft elastic capsule results in unexpectedly superior blood levels.

The parenteral dosage forms of the present invention for intramuscular, subcutaneous, intra-articular and intrabursal use include sterile solutions and suspensions, and sterile powders for the extemporaneous preparation of sterile injectables. In the case of sterile suspensions and powders, it is preferred that the active ingredient be of fine particle size, as alluded to above in connection with oral preparations. The solvent or suspending liquid comprises water, vegetable oils, or organic solvents, e.g., glycerol, propylene glycol, liquid polyethylene glycol, N,N-dimethylacetamide, 2,2-dimethyl-4-carbinol-1,3-dioxolane, isopropyl myristate, polysorbate 80, ethanol, benzyl alcohol, benzyl benzoate, and the like, or suitable mixtures thereof.

In the preparation of sterile powders for use in sterile injectables, the preferred method involves freeze-drying of a previously sterilized solution of the active ingredient plus any additional desired soluble ingredients to obtain a sterile, dry product. Powders for injectable suspensions are preferably sterilized by the use of a gas, such as ethylene oxide, after blending with the required additional ingredients in the proper particle size. Just prior to use, the sterile powder is reconstituted in the desired sterile suspending liquid.

The dosage of a 2,3-bis(p-methoxyphenyl)indole of Formula I dispersed in a pharmaceutically and physiologically acceptable carrier ranges from about 10 to about 1000 mg. in a single dose or in divided doses given one to four times daily and preferably, 25 mg. to 500 mg. one to four times a day, depending on the age, weight, and condition of the mammal, and frequency and route of administration.

The preferred oral dosage is 25–250 mg. three or four times a day. Preferably liquid oral preparations contain about 0.5 to about 5% w/v of the active ingredient.

The preferred parenteral dosage is 50–500 mg. once or twice a day. Preferably parenteral liquid preparations contain about 5 to about 50% w./v. of the active ingredient.

For topical use the preferred concentration is 0.25 to 10% and more preferably 1 to 5% and preferably in a dissolved state.

Various other active ingredients can be included in the formulations of the present invention to provide a supplementary effect which when employed in the treatment of certain conditions enhances the usefulness of the 2,3-bis-(p-methoxyphenyl)indoles of Formula I. Advantageous combinations of activity and synergistic action can be obtained. Thus, the 2,3-bis(p-methoxyphenyl)indoles can be effectively combined with other anti-inflammatory agents such as phenylbutazone (50–100 mg.), oxyphenbutazone (50–100 mg.), 6α-methylprednisolone (0.5–10 mg.), hydrocortisone (5–25 mg.), 6α-fluoroprednisolone (0.5–8 mg.), and prednisone or prednisolone (0.5–15 mg.); analgetic agents such as aspirin (150–600 mg.), N-acetyl-p-aminophenol (150–600 mg.), salicylamide (150–600 mg.), acetophenetidin (150–600 mg.), codeine (10–60 mg.); muscle relaxants such as carisoprodol (200–350 mg.), chlorphenesin carbamate (200–500 mg.), chlorzoxazone (250–500 mg.), methocarbamol (250–500 mg.); tranquilizers such as meprobamate (20–400 mg.), ectylurea (150–600 mg.), chlordiazepoxide (5–50 mg.), phenaglycodol (200–400 mg.); antidepressants such as methylphenidate (5–20 mg.), imipramine (10–100 mg.), amitriptyline (10–100 mg.), tranylcypromine (10–50 mg.); sedatives such as butabarbital or phenobarbital (8–60 mg.), amobarbital (15–120 mg.), methyprylon (50–100 mg.); antispasmodics such as methscopolamine bromide 1.5–5) mg.), homatropine methylbromide (0.5–5 mg.), propantheline bromide (5–30 mg.); vitamins such as ascorbic acid (as sodium ascorbate), B complex; antibiotics such as chloramphenicol, lincomycin, penicillins, tetracyclines, novobiocin, erythromycin, neomycin, polymyxin, bacitracin, nystatin.

Formulations (1) Tablets.—One thousand tablets for oral use, each containing 100 mg. of 2,3-bis(p-methoxyphenyl)indole, are prepared from the following ingredients:

| | Grams |
|---|---|
| 2,3-bis(p-methoxyphenyl)indole (very finely divided) | 100 |
| Dicalcium phosphate, N.F. | 200 |
| Methylcellulose, U.S.P. (15 cps.) | 6.5 |
| Talc | 30 |
| Calcium stearate | 3.5 |

The 2,3-bis(p-methoxyphenyl)indole and dicalcium phosphate are mixed well, granulated with 7.5% w./v. solution of methyl-cellulose in water, passed through a No. 8 screen and dried carefully. The dried granulates are passed through a No. 12 screen, mixed with talc and stearate and compressed into tablets.

Following the above procedure, tablets are similarly prepared substituting 10, 25, 50, 250 and 500 gm. of 2,3-bis(p-methoxyphenyl)indole for the 100 gm. of the example to prepare tablets having 10, 25, 50, 250 and 500 mg. amounts, respectively, of the compound.

To improve the blood levels of the principal active ingredient, about 1% by weight of the latter of dioctyl sodium sulfosuccinate is added to the tablet. This is incorporated as a fine powder in the initial mixture before granulating or by dissolving in the granulating solution.

The preceding tablets can be administered to dogs and cats at a daily dose of from 0.2 to 100 mg./kg. body weight for the treatment of rheumatoid arthritis.

(2) Hard Gelatin Capsules.—One thousand two-piece hard gelatin capsules for oral use, each capsule containing 75 mg. of 2,3-bis(p-methoxyphenyl)indole, are prepared from the following ingredients:

| | Grams |
|---|---|
| 2,3-bis(p-methoxyphenyl)indole (very finely divided) | 75 |
| Corn starch | 150 |
| Magnesium stearate | 25 |

The finely powdered ingredients are mixed thoroughly, then filled into hard gelatin capsules of appropriate size.

For improved blood levels, 1.5 gm. of finely powdered dioctyl sodium sulfosuccinate is mixed thoroughly with the rest of the ingredients before encapsulating.

(3) Hard Gelatin Capsules.—One thousand two-piece hard gelatin capsules for oral use, each capsule containing 50 mg. of 2,3-bis(p-methoxyphenyl)indole and 300 mg. of aspirin, are prepared from the following ingredients:

| | Grams |
|---|---|
| 2,3-bis(p-methoxyphenyl)indole (very finely divided) | 50 |
| Dioctyl sodium sulfosuccinate | 1 |
| Aspirin | 300 |
| Corn starch | 60 |
| Magnesium stearate | 5 |

One of two capsules three times a day are useful in reducing pain, fever and inflammation in rheumatoid arthritis.

(4) Hard Gelatin Capsules.—One thousand two-piece hard gelatin capsultes for oral use, each containing 50 mg. of 2,3-bis(p-methoxyphenyl)indole and 1 mg. of 6α-methylprednisolone, are prepared from the following ingredients:

| | Grams |
|---|---|
| 2,3-bis(p-methoxyphenyl)indole (fine particle size) | 50 |
| 6α-methylprednisolone | 1 |
| Corn starch | 150 |
| Magnesium stearate | 15 |

One or two capsules three times a day will relieve pain and inflammation in acute gouty arthritis.

(5) Hard Gelatin Capsules.—One thousand two-piece hard gelatin capsules for oral use, each containing 75 mg. of 2,3-bis(p-methoxyphenyl)indole and 400 mg. chlorphenesin carbamate, are prepared from the following ingredients:

| | Grams |
|---|---|
| 2,3-bis(p-methoxyphenyl)indole (fine particle size) | 75 |
| Chlorphenesin carbamate | 400 |
| Corn starch | 50 |
| Magnesium stearate | 5 |

One or two capsules three times a day are useful in the treatment of bursitis.

(6) *Aqueous Oral Suspension.*—An aqueous oral suspension containing in each five milliliters 50 mg. of 2,3-bis(p-methoxyphenyl)indole is prepared from the following ingredients:

| | |
|---|---|
| 2,3 - bis(p - methoxyphenyl)indole (fine particle size) _____gm__ | 100 |
| Methylparaben, U.S.P. _____gm__ | 7.5 |
| Propylparaben, U.S.P. _____gm__ | 2.5 |
| Saccharin sodium _____gm__ | 12.5 |
| Cyclamate sodium _____gm__ | 2.5 |
| Glycerin _____ml__ | 3000 |
| Tragacanth powder _____gm__ | 100 |
| Orange oil flavor _____gm__ | 10 |
| F. D. and C. orange dye _____gm__ | 7.5 |
| Deionized water, q.s. _____ml__ | 10,000 |

(7) *Aqueous Suspension for Injection.*—A sterile aqueous suspension for intramuscular or intraarticular injection, containing in each ml. 100 mg. of 2,3-bis(p-methoxyphenyl)indole, is prepared from the following ingredients:

| | |
|---|---|
| 2,3 - bis(p - methoxyphenyl)indole (fine particle size) _____gm__ | 100 |
| Sodium carboxymethylcellulose, low viscosity gm__ | 10 |
| Polysorbate 80, U.S.P. _____gm__ | 4 |
| Propylparaben, U.S.P. _____gm__ | 0.4 |
| Water for injection, q.s. _____ml__ | 1000 |

One or two milliliters is injected in the treatment of an acute arthritic shoulder joint.

(8) *Topical Ointment.*—One thousand grams of a topical ointment containing 2.5% of 2,3 - bis(p - methoxyphenyl)indole and 0.6% neomycin sulfate is prepared from the following ingredients:

| | Grams |
|---|---|
| 2,3 - bis(p - methoxyphenyl)indole (fine particle size) _____ | 25 |
| Neomycin sulfate (micronized) _____ | 6 |
| Light liquid petrolatum _____ | 250 |
| Wool fat _____ | 200 |
| White petrolatum q.s. _____ | 1000 |

The ointment is usefully applied to the skin for the local treatment of infection and inflammation.

(9) *Topical Ointment.*—One thousand grams of a topical ointment containing 5% of 2,3-bis(p-methoxyphenyl)indole is prepared from the following ingredients:

| | Grams |
|---|---|
| 2,3 - bis(p - methoxyphenyl)indole (fine particle size) _____ | 50 |
| Light liquid petrolatum _____ | 100 |
| Wool fat _____ | 200 |
| White petrolatum q.s. _____ | 1000 |

The ointment is usefully applied to the skin for the treatment of allergic dermatoses and other inflammatory skin diseases.

(10) *Topical Solution.*—One thousand milliliters of a topical solution containing 5% of 2,3-bis(p-methoxyphenyl)indole is prepared from the following ingredients:

| | |
|---|---|
| 2,3-bis(p-methoxyphenyl)indole, powder ____gm__ | 50 |
| N,N-dimethylacetamide q.s. _____ml__ | 1000 |

The 2,3-bis(p-methoxyphenyl)indole is dissolved in the N,N-dimethylacetamide with stirring. The solution is usefully applied to the skin for the treatment of allergic dermatoses and other inflammatory skin diseases.

(11) *Soft Elastic Capsules.*—One thousand soft elastic capsules for oral use, each containing 25 mg. of 2,3-bis(p-methoxyphenyl)indole, are prepared from the following ingredients:

| | |
|---|---|
| 2,3-bis(p-methoxyphenyl)indole, powder ____gm__ | 25 |
| N,N-dimethylacetamide (DMA) _____ml__ | 25 |
| Corn oil, U.S.P. q.s. _____ml__ | 500 |

The 2,3-bis(p-methoxyphenyl)indole is first dissolved in the DMA. Then the oil is added with stirring until a clear solution is obtained. Each capsule is filled with 0.5 ml. of the solution.

One or two capsules are used four times a day to relieve pain, fever and inflammation in rheumatoid arthritis.

The above solution, instead of being filled into capsules, can be used as an oral solution and administered in a teaspoonful (5 ml.) dose twice a day for the same purpose as the soft elastic capsules above.

The above solution, instead of being filled into capsules, can be used for intramuscular injection after suitable sterilization. One or two milliliters (50 or 100 mg. of active material) is used one to three times a day for the same purpose as the soft elastic capsules above.

(12) *Soft Elastic Capsules.*—One thousand soft elastic capsules for oral use, each containing 500 mg. of 2,3-bis(p-methoxyphenyl)indole, are prepared from the following ingredients:

| | |
|---|---|
| 2,3-bis(p-methoxyphenyl)indole, powder ____gm__ | 500 |
| N,N-dimethylacetamide (DMA), q.s. _____ml__ | 500 |

The 2,3-bis(p-methoxyphenyl)indole is dissolved in the DMA. Each capsule is then filled with 0.5 ml. of this solution.

(13) *Soft Elastic Capsules.*—One thousand soft elastic capsules for oral use, each containing 25 mg. of 2,3-bis(p-methoxyphenyl)indole are prepared from the following ingredients:

| | Grams |
|---|---|
| 2,3-bis(p-methoxyphenyl)indole, powder _____ | 25 |
| Polysorbate 80 _____ | 100 |
| Corn oil _____ | 35 |

The polysorbate 80 and corn oil are mixed and the drug is dissolved in this mixture by stirring and with the aid of heat. On cooling, the solution is filled into soft elastic capsules so that each contains 25 mg. of the active material. Good blood levels and useful results are obtained when used in the treatment of rheumatoid arthritis at a dose of one or two capsules three times a day.

(14) *Soft Elastic Capsules.*—One thousand soft elastic capsules for oral use, each containing 100 mg. of 2,3-bis(p-methoxyphenyl)indole, are prepared from the following ingredients:

| | Grams |
|---|---|
| 2,3-bis(p-methoxyphenyl)indole, powder _____ | 100 |
| Polysorbate 80 _____ | 450 |

The finely powdered 2,3-bis(p-methoxyphenyl)indole is dissolved in the polysorbate 80 with stirring. When a clear solution is obtained, soft elastic capsules are prepared in the usual manner. One capsule twice a day gives good blood levels and relieves pain, fever and inflammation in rheumatoid arthritis.

In a similar manner, but substituting 10, 25 and 50 gm. of 2,3-bis(p-methoxyphenyl)indole for the 100 gm. of the example, soft elastic capsules are prepared, each containing 10, 25 and 50 mg., respectively, of the active ingredient.

(15) *Oral Fluid.*—One thousand milliliters of an oral fluid containing 50 mg. of 2,3-bis(p-methoxyphenyl)indole in each 5 ml. is prepared from the following ingredients:

| | |
|---|---|
| 2,3-bis(p-methoxyphenyl)indole, powder ____gm__ | 10 |
| Cottonseed oil q.s. _____ml__ | 1000 |

The oil is heated to 60° C. and the powder is added gradually with stirring until it is completely in solution.

One or two teaspoonfuls (5 to 10 ml.) three times a day will relieve pain and inflammation in rheumatoid arthritis.

(16) Oral Fluid.—One thousand milliliters of an oral fluid containing 75 mg. of 2,3-bis(p-methoxyphenyl)indole in each teaspoonful (5 ml.) is prepared from the following ingredients:

| | |
|---|---|
| 2,3-bis(p-methoxyphenyl)indole, powder ____gm__ | 15 |
| Corn oil q.s. _____ml__ | 1000 |

The oil is heated to 60° C. and the powder is added gradually with stirring until it is completely in solution.

For an oral fluid containing in each teaspoonful (5 ml.) 150 mg. of 2,3-bis(p-methoxyphenyl)indole, to the above preparation is added, at room temperature, an additional 15 gm. of the active material having a particle size of about 0.5 micron. This preparation gives excellent blood levels of the drug.

(17) Oral Emulsion.—Twenty-five hundred milliliters of an oral fat emulsion containing in solution 50 mg. of 2,3-bis(p-methoxyphenyl)indole in each teaspoonful (5 ml.) is prepared from the following ingredients:

| | |
|---|---|
| 2,3-bis(p-methoxyphenyl)indole, powder ___gm__ | 25 |
| Corn oil, U.S.P. _____ml__ | 1675 |
| Butylated hydroxyanisole _____gm__ | 0.1975 |
| d-Alpha tocopheryl acetate _____gm__ | 0.375 |
| Benzoic acid, powder _____gm__ | 1.25 |
| Emcol D70-30 (glyceride phosphates) ____gm__ | 12.5 |
| Sodium benzoate _____gm__ | 1.25 |
| Sodium cyclamate _____gm__ | 7.5 |
| Sorbic acid _____gm__ | 1.75 |
| Polysorbate 80, U.S.P. _____gm__ | 5 |
| Deionized water q.s. _____ml__ | 2500 |

The oil is heated to 60° C. and the active material, butylated hydroxyanisole, d-alpha tocopheryl acetate, benzoic acid and Emcol are added. The mixture is removed from the heat and stirred until all ingredients go into solution. The remaining ingredients are added to 825 ml. of water and dissolved with the aid of heat. Both phases are cooled. Then the oil phase is added to the water phase with vigorous stirring to produce an emulsion. Finally, the emulsion is homogenized.

One or two teaspoonfuls (5 to 10 ml.) of the emulsion taken three times a day gives superior blood levels of the drug and relieves fever, pain and inflammation in rheumatoid arthritis.

I claim:

1. A 2,3-bis(p-methoxyphenyl)indole having the formula:

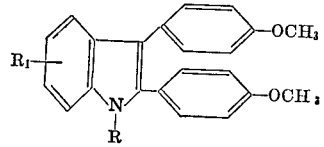

wherein R is selected from the group consisting of hydrogen, methyl, and alkanoyl of one to four carbon atoms, inclusive, and $R_1$ is selected from the group consisting of hydrogen, halogen, alkoxy of one to three carbon atoms, inclusive, and alkyl of one to three carbon atoms, inclusive.

2. 2,3-bis(p-methoxyphenyl)indole.
3. 4-methoxy-2,3-bis(p-methoxyphenyl)indole.
4. 5-methoxy-2,3-bis(p-methoxyphenyl)indole.
5. 6-methoxy-2,3-bis(p-methoxyphenyl)indole.
6. 7-methoxy-2,3-bis(p-methoxyphenyl)indole.
7. 5-methyl-2,3-bis(p-methoxyphenyl)indole.
8. 7-methyl-2,3-bis(p-methoxyphenyl)indole.
9. 5-chloro-2,3-bis(p-methoxyphenyl)indole.
10. 5-fluoro-2,3-bis(p-methoxyphenyl)indole.
11. 7-fluoro-2,3-bis(p-methoxyphenyl)indole.
12. 1-methyl-2,3-bis(p-methoxyphenyl)indole.
13. 1-acetyl-2,3-bis(p-methoxyphenyl)indole.

References Cited

Mentzer et al., Chemical Abstracts, vol. 47:2166b.
Mentzer et al., Chemical Abstracts, vol. 44:5346-7.

NICHOLAS S. RIZZO, *Primary Examiner.*

J. A. NARCAVAGE, *Assistant Examiner.*